United States Patent
Korner et al.

[11] 3,973,807
[45] Aug. 10, 1976

[54] WIRE CABLE CHAIN WITH DETACHABLE TRAVELING CUSHIONS

[75] Inventors: Otto Korner, Wermelskirchen; Fritz Benninghoff; Klaus Spies, both of Remscheid, all of Germany

[73] Assignee: DIEHL, Nurnberg, Germany

[22] Filed: July 15, 1974

[21] Appl. No.: 488,484

[30] Foreign Application Priority Data
July 19, 1973 Germany............................ 7326485

[52] U.S. Cl................................. 305/40; 305/35 R
[51] Int. Cl.²............................................ B62D 55/18
[58] Field of Search................. 305/40, 35 R, 35 EB, 305/54; 74/245 R, 245 S; 198/194; 59/78

[56] References Cited
UNITED STATES PATENTS

| | | | |
|---|---|---|---|
| 1,194,962 | 8/1916 | Crowe.................................... | 59/78 |
| 2,162,700 | 6/1939 | Christmas........................ | 305/35 R |
| 2,686,697 | 8/1954 | Baker................................ | 305/35 R |
| 2,733,965 | 2/1956 | Gladden............................ | 305/35 R |
| 3,734,577 | 5/1973 | Snellman.............................. | 305/40 |
| 3,819,239 | 6/1974 | Arcouette........................ | 305/35 R |

FOREIGN PATENTS OR APPLICATIONS
916,650   10/1945   France................................. 305/40

Primary Examiner—M. H. Wood, Jr.
Assistant Examiner—John A. Carroll
Attorney, Agent, or Firm—Walter Becker

[57] ABSTRACT

A wire cable chain in which spaced links are connected by wire cables. Resilient cushion structures are provided extending between each pair of adjacent links. Each link has a transverse groove on the cushion structure side and each cushion structure has a metal flange at each of the fore and aft edges insertable in one end of said groove and slidable in the groove into fully inserted position. An abutment stops each cushion structure in inserted position in the chain and cams on the cushion structure cooperate with abutment shoulders on the chain links to lock each cushion structure in inserted position.

9 Claims, 6 Drawing Figures

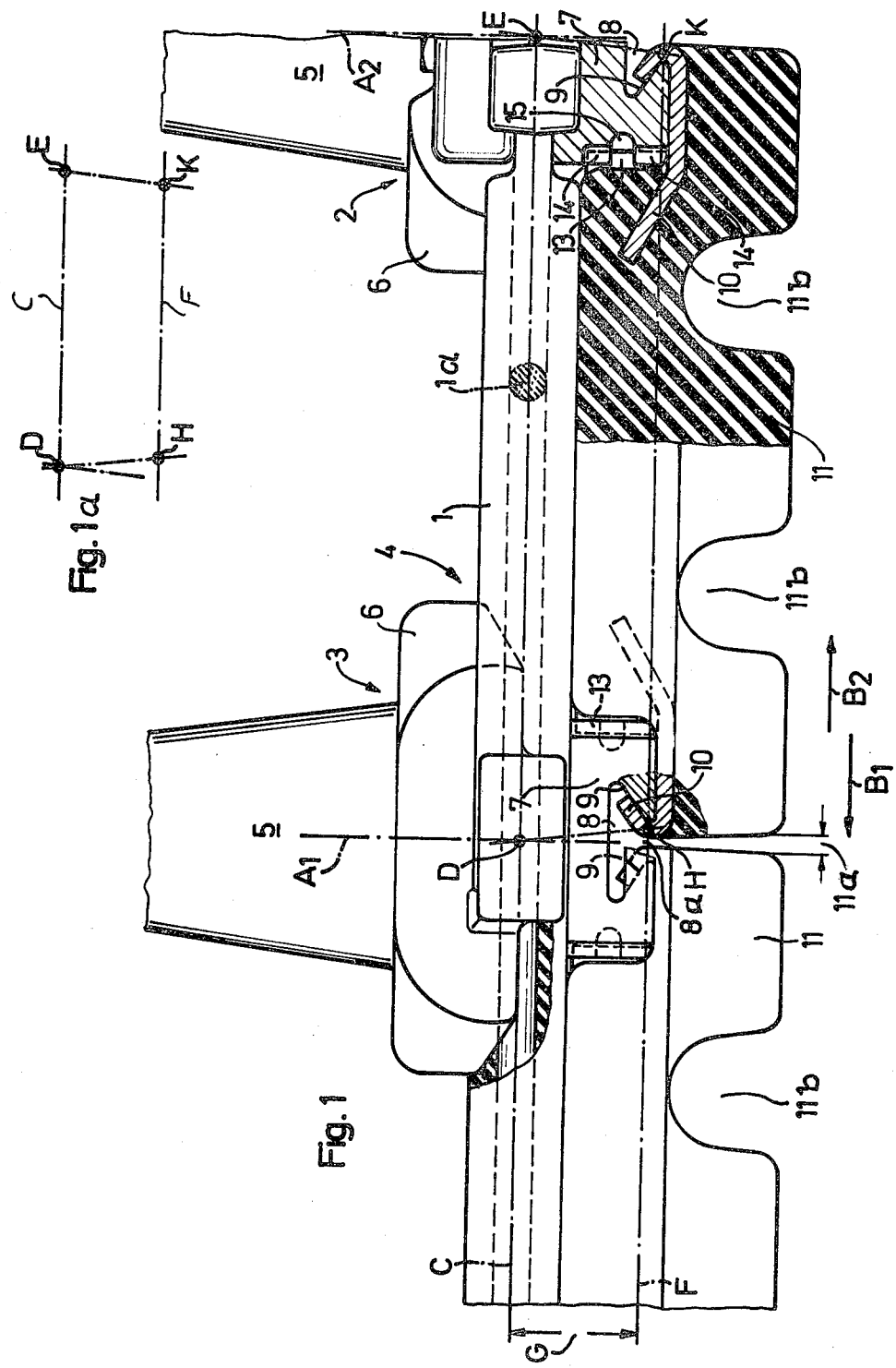

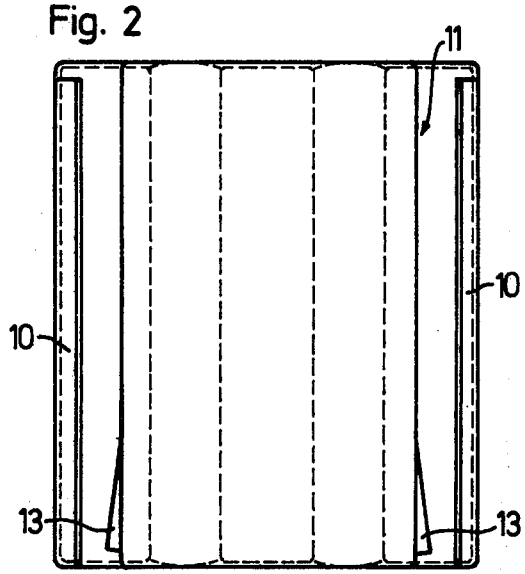
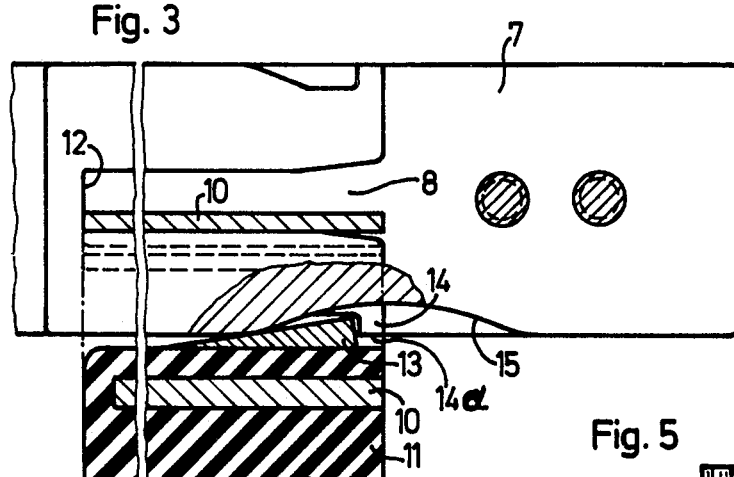
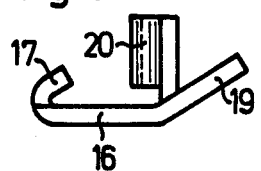
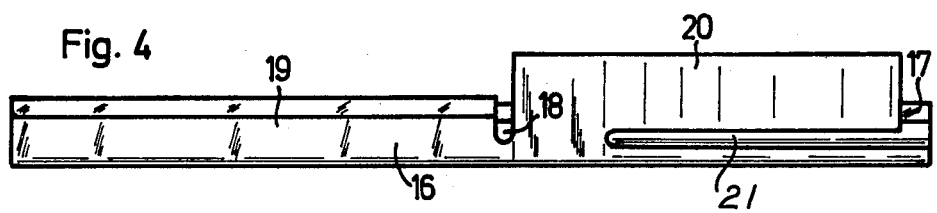

WIRE CABLE CHAIN WITH DETACHABLE TRAVELING CUSHIONS

The present invention relates to a wire cable with traveling cushions in which the chain links interconnected by said cable are equipped with exchangeable traveling cushions.

German Offenlegungsschrift No. 2,064,454 discloses a cable chain in which the chain links are respectively equipped with traveling cushions screwed onto chain link plates.

It is an object of the present invention to provide a light weight cable chain with absorbed oscillations.

This object and other objects and advantages of the invention will appear more clearly from the following specification, in connection with the accompanying drawings, in which:

FIG. 1 is a fragmentary side view of a cable chain according to the invention, partly broken away.

FIG. 1a illustrates a joint quadrangle of the chain section of FIG. 1, but on a smaller scale than that of FIG. 1.

FIG. 2 is a traveling cushion according to FIG. 1 viewed from the chain side.

FIG. 3 is a plan section through a lower plate of a chain link according to FIG. 1.

FIG. 4 is a modified guiding rail for use in connection with the arrangement of FIG. 1.

FIG. 5 is a view looking in from the left end of FIG. 4.

The problem underlying the present invention has been solved by having the running cushions positively insertable between the chain links, and more specifically, having the running cushions insertable in a direction transverse to the direction of movement of the chain while guiding rails provided with abutments are arranged on he running cushions and on the chain links, guiding rails being undercut.

The present invention brings about the advantage that the traveling cushion which additionally interconnects two adjacent chain links interconnected by cables act as a structural element which dampens oscillations. In this way there is obtained utility providing a relative quiet rolling behavior of the chain on a hard support, free from any tendency to beat or oscillate. Moreover, the advantage is realized that damaged running cushions can quickly and easily be exchanged.

According to a further development of the invention, each chain link has a guiding rail located in its plane of symmetry on the traveling path, said guiding rail being formed by a recess with guiding jaws located opposite to each other. In this way, a narrow and easy construction of a chain link is possible while additionally the advantage is obtained that the running cushion can be arranged relative to each other with a narrow air gap or space permitting a narrow band-shaped rolling of the cable chain.

According to a still further embodiment of the invention, the guiding rail comprises on one longitudinal side a V-shaped guiding ear insertable into the chain link and on the oppositely located side has an anchor plate adapted to be vulcanized with the running cushion and also has a resilient safety ear. This guiding rail which is connected to the running cushion is a punched and bent element which can be produced at low cost and which conveys pull or braking forces occurring on the driving side to the running cushion and on the other hand safely prevents the running cushion in the chain link from a transverse displacement.

Referring now to the drawings in detail, with the arrangement shown in FIG. 1, rubberized wire cables $1a$ combined to a band 1 are connected in a locking chain link 2 and an intermediate chain link 3 of a chain segment 4 having a length of approximately one meter. This connection may be effected in any suitable manner.

Each of the chain links 2, 3 has an upper plate 6 connected to a gripper tooth 5 and also has a lower plate 7 which is connected to the upper plate 6.

Provided in said lower plate 7 and located on the traveling side are recesses 8 with guiding jaws 9, said recesses 8 with guiding jaws 9 being located in the planes of symmetry $A_1$, $A_2$ of the lower plates 7. Inserted into said recesses 8 with guiding jaws 9 are running cushions 11 provided with guiding rails 10. These running cushions 11 are inserted at a right angle with regard to the direction of movement $B_1$, $B_2$ with regard to the running direction of the chain and have a relatively small distance from each other indicated by the reference numeral $11a$.

Each running cushion 11 has structure with two recesses $11b$ arranged transverse to the direction of movement or running direction of the chain. These recesses $11b$ will, during the rolling of the chain 4 around a non-illustrated traveling ring reduce any occurring bending stresses. Moreover, the recesses $11b$ also contribute to a soft rolling behavior of the cable chain.

For purposes of securing the traveling or running cushions 11 in the lower plate 7, abutments and safety devices for securing the respective position are provided as they will now be described in connection with FIGS. 2 and 3. The lower plate 7 has at the end of the recess 8 an abutment 12 engaged by the guiding rail 10. In order to safeguard the running cushion 11 against being laterally pressed out accidentally during the driving operation, the running cushion 11 is provided or has vulcanized therein a sawtoothshaped resilient sheet metal ear or cam 13 which engages an abutment 14 of the lower plate 7, said abutment being arranged on the outside, and which locates the running cushion at a predetermined preload on the guiding jaw 9. The abutments 12, 14 are lock means for locking guide rails in fully inserted position in groove means.

In order to be able to slip the running cushion out of the lower plate 7 for purposes of exchanging the same, the lower plate 7 has a groove means or milled-out portion 15 which penetrates the abutment 14. In this way, a non-illustrated wedge can be introduced into the groove means or milled-out portion 15 for bridging the locking effect of the sheet metal ear or cam 13 to which end the sheet metal ear or cam 13 is pressed back beyond the upper edge $14a$ of the abutment.

The behavior of such cable chain adapted to dampen oscillations is due to the fact that when considering FIG. 1 in an abstracting manner, the chain links 2, 3 together with the cables located in a running plane C parallel adjacent to each other form at D and E rotatable joints with a degree of liberty (pitching motions). After the caterpillar chain links 2, 3 in a second plane F which is parallel to the plane movement C and spaced from the plane of movement C by a distance A are elastically connected by the running cushion 11 on the places forming the rotary joints H,K, a joint quadrangle DEHK (FIG. 1) is obtained which is oscillation-cushioned by the running cushion 11. The plane F is defined by the connection of the cross sections 8a of the recesses 8. By bisecting the wall thickness of the guiding rails 10 engaging the guiding jaws 9 and located in the plane F, the rotary joints H,K are located. Due to this cushion joint quadrangle, the oscillation and shocks are greatly damped which occur during the driving operation of the chain in view of pull and pressure stresses and in view of the chain links due to the impact of the chain links dropping off from the chain reversing wheel 10 onto the driving path. In this way, damping or cushioning devices already provided on the driving carriage can be dimensioned lighter.

According to FIGS. 4 and 5 a guiding rail 16 corresponding to rail 10 of FIGS. 1 to 3 is subdivided into three sections. The first section which is only partially visible comprises a V-shaped bent guiding ear 17 (FIG. 5) which extends in a V-shaped manner over the entire length of the guiding rail for engagement with a jaw 9. The second and third sections consisting of an anchor plate 19 integral with guiding ear 17, and a resilient safety ear or cam 20, are separated from each other by a recess 18. A slot 21 separates the major portion of the length of ear or cam 20 from guiding rail 16 whereby the free end of ear or cam 20 is resilient on the guiding rail.

The guiding rail 16 is substantially over the entire anchor plate 19 vulcanizable to the running cushion 11. The resilient ear 20 or cam serves primarily in cooperation with the abutment 14 (FIG. 3) as safety for the transverse location of the cushion in the chain links 3 and 4.

It is, of course, to be understood that the present invention is, by no means, limited to the specific showing in the drawings, but also comprises any modifications within the scope of the appended claims.

What is claimed is:

1. In combination with a wire cable chain having a running direction; spaced chain links each having a transverse plane of symmetry, wire cables connecting said links and extending in the running direction of said chain, and running cushion structures extending between and connected to pairs of adjacent links, each link having transverse groove means formed therein with an open end thereof, each said cushion structure comprising a body of flexible, resilient material elastically connecting successive links and transverse metal guide rails carried thereby at opposite ends and connected to said successive links, said guide rails being positively insertable transverse to the running direction of the chain in the open ends of said groove means on opposite sides of said plane of symmetry and slidable laterally of the chain in said groove means, and lock means for locking said guide rails in fully inserted position in said groove means.

2. In combination with a wire cable chain having a running direction; spaced chain links each having a plane of symmetry, wire cables connecting said links and extending in the running direction of said chain, and running cushion structures extending between and connected to pairs of adjacent links, each link having gransverse groove means formed therein with ends and including an open side thereof, each said cushion structure comprising a body of resilient material and metal guide rails carried thereby, said guide rails being positively insertable transverse to the running direction of the chain between the chain links in the ends of said groove means and slidable laterally of the chain in said groove means, and lock means for locking said guide rails in fully inserted position in said groove means, each link having a member on the cushion structure side having the respective groove means therein, each groove means being in the plane of symmetry of the chain link, each groove means tapering outwardly from the open side thereof toward the cooperating chain link to present inclined surfaces for engagement by the cooperating guide rails, said guide rails having bent over flanges for engagement with said inclined surfaces.

3. A wire cable chain in combination according to claim 2 in which each said link includes an abutment which is engaged by the cooperating guide rails in fully inserted position thereof, said lock means including cooperating elements of a resilient cam and abutment shoulder on each said link and each said cushion structure pertaining thereto.

4. A wire cable chain in combination according to claim 3 in which each abutment shoulder is on said chain link and is near the side of the cooperating chain link into which the cooperating guide rail is insertable into the cooperating groove means and faces the other side of the chain link.

5. A wire cable chain in combination according to claim 2 in which each resilient body is generally rectangular when viewed from the side and on the side facing away from the chain includes at least one transverse recess formed therein.

6. A wire cable chain in combination according to claim 4 in which each guide rail has a said resilient cam thereon, each cam tapering outwardly in a direction opposite to the direction of insertion of the guide rail into said groove means and terminating in a shoulder adapted to engage said abutment shoulder.

7. A wire cable chain in combination according to claim 4 in which each guide rail has a said resilient cam thereon, each cam comprising a resilient ear portion integral with the adjacent guide rail, the free end of said ear portion adapted to engage said abutment shoulder.

8. A wire cable chain in combination according to claim 2 in which each body is rubber-like material, each guide rail having a plate-like portion imbedded in and vulcanized to said body, each guide rail including a bent over flange along one edge integral with said plate portion and protruding from said body.

9. In a wire cable chain movable longitudinally in a running direction and about a traveling ring, a plurality of spaced chain links on said chain, said chain including a plurality of wire cables with said chain links fixed to said cables, each link having a central plane of symmetry transverse to said chain, individual flexible resilient cushion structures connecting said links and supporting said wire cable chain, each of said cushion structures having its opposite ends connected to two successive links, so that said cushioning structures individually elastically connect said links resiliently and flexibly as said chain travels in the running direction and around the traveling ring, the ends of said cushioning structures connected to each link being spaced sufficiently to allow flexing of said chain with said plane of symmetry extending through the space between the ends of the structures.

* * * * *

UNITED STATES PATENT OFFICE
CERTIFICATE OF CORRECTION

Patent No. 3,973,807           Dated August 10, 1976

Inventor(s) Otto Korner et al.

It is certified that error appears in the above-identified patent and that said Letters Patent are hereby corrected as shown below:

In item [30] the following should be included:

-- July 19, 1973    Fermany ............2336742 -- .

Signed and Sealed this

First Day of February 1977

[SEAL]

Attest:

RUTH C. MASON
*Attesting Officer*

C. MARSHALL DANN
*Commissioner of Patents and Trademarks*